United States Patent
Thurston et al.

(10) Patent No.: US 12,031,052 B2
(45) Date of Patent: Jul. 9, 2024

(54) MULTI-LAYERED ELASTOMER-BASED LINERS

(71) Applicant: ASSET GUARD PRODUCTS INC., Houston, TX (US)

(72) Inventors: Richard Parker Thurston, Argyle, TX (US); Richard Davis, Argyle, TX (US)

(73) Assignee: ASSET GUARD PRODUCTS INC., Houston, TX (US)

( * ) Notice: Subject to any disclaimer, the term of this patent is extended or adjusted under 35 U.S.C. 154(b) by 0 days.

(21) Appl. No.: 17/947,400

(22) Filed: Sep. 19, 2022

(65) Prior Publication Data
US 2024/0093055 A1 Mar. 21, 2024

(51) Int. Cl.
*C09D 175/04* (2006.01)
*B05D 7/00* (2006.01)
(Continued)

(52) U.S. Cl.
CPC ............ *C09D 175/04* (2013.01); *B05D 7/52* (2013.01); *B65D 90/046* (2013.01); *B65D 90/24* (2013.01); *C08K 3/22* (2013.01); *C08K 3/36* (2013.01); *C08K 7/20* (2013.01); *C09D 175/02* (2013.01); *B05D 2201/02* (2013.01); *B05D 2503/00* (2013.01); *C08K 2003/2227* (2013.01); *C08K 2201/003* (2013.01); *C08K 2201/019* (2013.01)

(58) Field of Classification Search
CPC ...... C09D 175/04; C09D 175/02; B05D 7/52; B05D 2201/02; B05D 2503/00; B65D 90/046; B65D 90/24; C08K 3/22; C08K 3/36; C08K 7/20; C08K 2003/2227; C08K 2201/003; C08K 2201/019

USPC ...................................................... 428/423.1
See application file for complete search history.

(56) References Cited

U.S. PATENT DOCUMENTS

| 9,056,714 | B2 | 6/2015 | Whitener |
| 2003/0047836 | A1 | 3/2003 | Rickner et al. |
| 2004/0123541 | A1* | 7/2004 | Jewett .................. E04B 1/98 52/506.01 |

(Continued)

OTHER PUBLICATIONS

Freedom Chemical, "Freedomtuff (R) 1570 Product Information Bulletin", Jan. 2019, at https://freedomchemicalcorp.com/wp-content/uploads/2023/08/FREEDOMTUFF-1570-ALIPHATIC.pdf (Year: 2019).*

(Continued)

*Primary Examiner* — Callie E Shosho
*Assistant Examiner* — Steven A Rice
(74) *Attorney, Agent, or Firm* — Patterson + Sheridan, LLP

(57) ABSTRACT

The present disclosure relates to multi-layered elastomer-based liners. In at least one embodiment, a coated substrate includes a substrate and a first elastomer coating disposed on the substrate. The first elastomer coating is substantially free of sulfur and includes a first elastomer selected from the group consisting of a polyurea, a polyurethane, a polyurea-polyurethane copolymer, and combinations thereof. The coated substrate includes a second elastomer coating disposed on the first coating. The second elastomer coating includes a second elastomer selected from the group consisting of a polyurea, a polyurethane, a polyurea-polyurethane copolymer, and combinations thereof. The first elastomer is the same as or different than the second elastomer and at least one of the first elastomer or the second elastomer is a polyurea-polyurethane copolymer.

17 Claims, 2 Drawing Sheets

(51) Int. Cl.
*B65D 90/04* (2006.01)
*B65D 90/24* (2006.01)
*C08K 3/22* (2006.01)
*C08K 3/36* (2006.01)
*C08K 7/20* (2006.01)
*C09D 175/02* (2006.01)

(56) References Cited

U.S. PATENT DOCUMENTS

2008/0003060 A1* 1/2008 Perkins ............... B65D 90/24
　　　　　　　　　　　　　　　　　　　　　　　　　405/107
2008/0141903 A1  6/2008 Barancyk et al.
2015/0284924 A1* 10/2015 Whitener ............. B65D 88/34
　　　　　　　　　　　　　　　　　　　　　　　　　220/216
2019/0270583 A1* 9/2019 Thurston ............. B65D 88/34
2020/0207026 A1  7/2020 Goldsmith
2021/0178553 A1  6/2021 Herbert et al.

OTHER PUBLICATIONS

Freedom Chemical, "Freedomtuff (R) 1595 Product Information Bulletin", Jan. 2019, at https://freedomchemicalcorp.com/wp-content/uploads/2023/05/FREEDOMTUFF-1595-ALIPHATIC.pdf (Year: 2019).*

Raptor Blaster, "Sandblasting Grit Conversion Chart", Feb. 28, 2019, p. 2, at https://www.raptorblaster.com/sandblasting-grit-conversion-chart/ (Year: 2019).*

International Search Report And Written Opinion dated Jan. 4, 2024 for Application No. PCT/US 23/32583.

* cited by examiner

MULTI-LAYERED ELASTOMER-BASED LINERS

FIELD

The present disclosure generally relates to multi-layered elastomer-based liners.

BACKGROUND

Liners (sheets) are substrates having a coating disposed on the substrate and are used as covers for open water storage such as lagoons and in secondary containment units for oil and gas recovery. In particular, above-ground petroleum storage tanks, chemical storage tanks and similar facilities typically utilize a secondary containment system for capturing hazardous liquid that leaks or spills from the tank. Secondary containment is also used for retention ponds, lakes, and similar facilities to prevent polluting substances such as drill water, acids, gasses, and other chemicals from entering the water table. Conventional secondary containment systems use an impermeable or impervious liner that extends across a basin or retention area. The liner, which is designed to prevent petroleum, chemicals, and other chemicals from seeping into the ground, typically comprises a plurality of juxtaposed geotextile fabric panels. These panels are cut as required, arranged across the containment area and then sprayed with a polyurea coating that renders the panels impermeable to the passage of liquids discharged from the tank or otherwise held in the retention facility.

For lagoons, the coating of the liner has weight, and too much coating can impact the engineered buoyancy of the liner, i.e., the relationship between the weight of the coated substrate and the buoyancy of the overall liner.

In addition, pre-sprayed polyurea liner has been provided as a single layer polyurea coating applied directly to a substrate, such as a woven or non-woven polypropylene or polyester geotextile. Such coatings are considered to be thick (40-60 mils), and a light overspray of polyurea is often applied to the top polyurea surface to provide texture if desired. However, the high cost of different polyurea coatings for specific applications such as for potable water can be cost prohibitive. In addition, if an overspray or topcoat is applied in the field or at the time of installation (e.g., at an oil and gas well site), proper surface preparation of the substrate must be performed over the entire substrate surface, otherwise inter-coat delamination can occur. Surface preparation can include acetone wash and grinding the surface with a grinding wheel. Proper surface preparation entails a substantial amount of work which drives up costs and oftentimes is not done correctly or sufficiently resulting in poor quality including blistering and delamination of the coating of the liner.

There is a need for improved methods for making liners as well as a need for liners having improved coatings that provide cost benefits in addition to reduced blistering and delamination.

References for citing in an Information Disclosure Statement include (37 CFR 1.97(h)): U.S. 2015/0284924; U.S. 2022/0073272; U.S. 2014/0353310; U.S. Pat. No. 7,922,423

SUMMARY

The present disclosure generally relates to multi-layered elastomer-based liners.

In at least one embodiment, a coated substrate includes a substrate and a first elastomer coating disposed on the substrate. The first elastomer coating includes a first elastomer selected from the group consisting of a polyurea, a polyurethane, a polyurea-polyurethane copolymer, and combinations thereof. The coated substrate includes a second elastomer coating disposed on the first coating. The second elastomer coating is substantially free of sulfur and includes a second elastomer selected from the group consisting of a polyurea, a polyurethane, a polyurea-polyurethane copolymer, and combinations thereof. The first elastomer is the same as or different than the second elastomer and at least one of the first elastomer or the second elastomer is a polyurea-polyurethane copolymer.

In at least one embodiment, a method of making a coated substrate includes applying a first liquid elastomer to a substrate at a first fluid temperature of about 100 degrees Fahrenheit to about 200 degrees Fahrenheit to form the first elastomer coating. The method includes applying a second liquid elastomer to the first elastomer coating at a second fluid temperature of about 100 degrees Fahrenheit to about 200 degrees Fahrenheit during a set time of the first elastomer coating to form a second elastomer coating disposed on the first elastomer coating. The second elastomer coating is substantially free of sulfur. The second fluid temperature is the same as or different than the first fluid temperature.

BRIEF DESCRIPTION OF THE FIGURES

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this present disclosure and are therefore not to be considered limiting of its scope, for the present disclosure may admit to other equally effective aspects.

Figure 1:
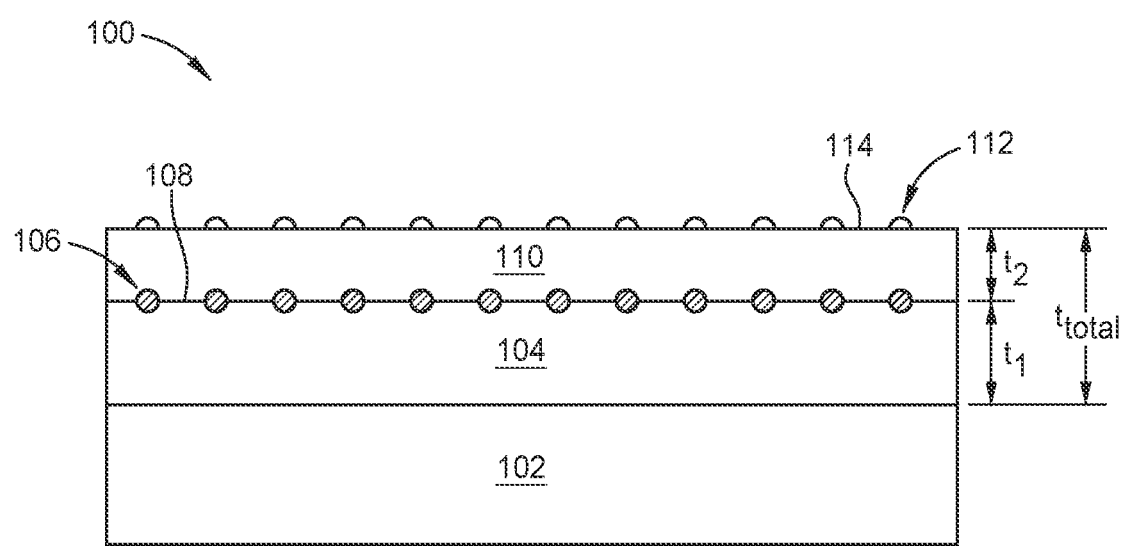
FIG. 1 is a cross-sectional side view of a liner, according to an embodiment.

To facilitate understanding, identical reference numerals have been used, where possible, to designate identical elements that are common to the figures. The figures are not drawn to scale and may be simplified for clarity. It is contemplated that elements and features of one aspect may be beneficially incorporated in other aspects without further recitation.

DETAILED DESCRIPTION

The present disclosure generally relates to multi-layered elastomer-based liners. More specifically, the present disclosure provides improved methods for making liners as well as a need for liners having improved coatings that provide cost benefits in addition to reduced blistering and delamination. In some embodiments, a primary (elastomeric) coating is applied to a substrate at an initial coating thickness (e.g., 20-50 mils) followed by a secondary spray topcoat applied within the recoat window of the primary coating (e.g., before the primary coating gels and/or becomes tack free) providing multiple benefits, such as reducing the overall cost of the resulting liner in addition to mitigating quality issues of conventional liners related to poor or insufficient preparation (e.g., blistering and delamination). Methods of the present disclosure can also mitigate, or even eliminate, labor-intensive surface preparation of substrates prior to coating, rendering such surface preparations merely optional, because (1) when pre-sprayed liner is used as an overlay one does not have to prepare the surface beneath such as concrete or steel that would otherwise be prepared and directly coated and (2) if you have a liner that has already been coated and you want to add a top coat after the recoat window of the first coating then you would have to prepare the entire surface before applying the second coating.

In some embodiments, for applications where a texture or slip resistant feature is desired for the liner, after the primary coating is applied and before the second coating is applied, an abrasive medium is applied to the surface of the primary coating within the primary coating's recoat window (e.g., during a gel window and/or tack free window). This allows for the medium to embed into the primary coating, and application of the secondary coating "locks-in" the medium to create the desired texture or non-slip surface. This approach can provide additional cost savings because the abrasive medium can be utilized solely at the surface of the primary coating (instead of dispersed throughout the primary coating, which would otherwise weaken the strength of the primary coating). This approach also reduces or eliminates loss of abrasive medium over time, as compared to a liner having an abrasive medium applied to a primary coating and in the absence of a secondary coating.

Liners of the present disclosure can provide high quality, low cost solutions for applications meeting high performance characteristics such as NSF61 potable water, UV color stability, NF SI B101.3-2022 DCOF (dynamic coefficient of friction) high abrasion or chemical resistant application. Therefore the topcoat systems are NSF61 certified, aliphatic, and/or high abrasion resistant.

In at least one embodiment, a coated substrate includes a substrate and a first elastomer coating disposed on the substrate. The first elastomer coating includes a first elastomer selected from the group consisting of a polyurea, a polyurethane, a polyurea-polyurethane copolymer, and combinations thereof. The coated substrate includes a second elastomer coating disposed on the first coating. The second elastomer coating includes a second elastomer selected from the group consisting of a polyurea, a polyurethane, a polyurea-polyurethane copolymer, and combinations thereof. The first elastomer is the same as or different than the second elastomer and at least one of the first elastomer or the second elastomer is a polyurea-polyurethane copolymer.

In at least one embodiment, a method of making a coated substrate includes applying a first liquid elastomer to a substrate at a first fluid temperature of about 100 degrees Fahrenheit to about 200 degrees Fahrenheit to form the first elastomer coating. The method includes applying a second liquid elastomer to the first elastomer coating at a second fluid temperature of about 100 degrees Fahrenheit to about 200 degrees Fahrenheit during a set time of the first elastomer coating to form a second elastomer coating disposed on the first elastomer coating. The second fluid temperature is the same as or different than the first fluid temperature.

Liners

Liners of the present disclosure can include a substrate, a first coating, abrasive material disposed on the first coating, and a second coating disposed on the first coating and the abrasive material.

FIG. 1 is a cross-sectional side view of a liner 100 of the present disclosure. As shown in FIG. 1, liner 100 has a substrate 102. A first coating 104 is disposed on the substrate 102. A plurality of abrasive material 106 is disposed at a surface 108 of the first coating 104. A second coating 110 is disposed on the plurality of abrasive material 106 and the surface 108 of the first coating 104. In some embodiments (not shown), abrasive material is additionally or alternatively disposed on second coating 110. The liner 100 further includes a plurality of protrusions 112 at a surface 114 of second coating 110. The plurality of protrusions 112 provide texture (e.g., a non-slip surface) at the surface 114 of the second coating 110 and are formed due to the presence of the plurality of abrasive material 106 (e.g., plurality of abrasive particles) located at the surface 108 of the first coating 104. In some embodiments, a liner of the present disclosure has a traction level of about 0.42 or above, such as about 0.43 to about 0.6, such as about 0.45 to about 0.5, according to NSFI B101.3-2020 DCOF floor evaluation. In some embodiments, the first coating 104 has a thickness (t1) of about 5 mils to about 100 mils, about 5 mils to about 60 mils, such as about 25 mils to about 40 mils, such as about 30 mils to about 35 mils. The second coating 110 has a thickness (t2) of about 5 mils to about 40 mils, such as about 5 mils to about 30 mils, such as about 10 mils to about 20 mils or about 5 mils to about 10 mils. The first coating 104 and the second coating 110 together can have a total thickness ($t_{total}$) that is thinner than conventional one coating liners, which provides reduced overall weight of the liners of the present disclosure and improves overall buoyancy of the liner. In some embodiments, the total thickness (t tot a) of the first coating 104 and the second coating 110 is about 40 mils to about 90 mils, alternatively about 60 mils or less, such as about 10 mils to about 60 mils, such as about 10 mils to about 50 mils, such as about 20 mils to about 40 mils.

In some embodiments, additional elastomer coatings are provided as part of the coated substrate. For example, after the first coating 104 and the second coating 110 are applied to substrate 102, the liner can be flipped over to expose the remaining surface area of the substrate 102. Then, a third elastomer coating (not shown), which can be the same as or similar to the first coating 104, is applied to the substrate 102. Then, (e.g., during the recoat window of the third elastomer coating), a fourth elastomer coating (not shown), which can be the same as or similar to the second coating 110, is applied to the third elastomer coating. As an example, the substrate 102 can be encapsulated with one or more elastomer coatings which provides the coated substrate to be substantially impervious to water. The coatings can also prevent or eliminate, or at least mitigate, moisture absorption by the substrate. The coatings can also protect the substrate from damage during handling in storage, transportation, and installation.

Substrates

A substrate of the present disclosure can be any suitable substrate.

In some embodiments, a substrate includes a flexible geotextile fabric sheet that is constructed of an industrial fabric composed of woven fibers. A geotextile fabric can be made of polypropylene or polyester fibers. A geotextile fabric can provide reinforcement in the ground while allowing for drainage or filtering such as for erosion control.

The sheet is a substrate to which a liquid elastomer coating that is impermeable to liquids is spray coated or otherwise applied to the sheet.

In some embodiments, a substrate may be made of or include polyurethane (e.g., expanded polyurethane), concrete, metal, wood, paper, fiber glass, fiber board, gravel, or combinations thereof. The substrate may be made of or include an open-cell foam or closed-cell foam. Open cell foam has an open cellular structure which allows moisture or vapors to pas through it while a closed cellular foam has a closed cellular structure which blocks moisture or vapor passage since the cells are sealed off. Because of this difference, open cell foam tends to be softer when compressed while closed cell foam tends to be stiffer when compressed. Foam can be a polystyrene (e.g., expanded polystyrene), polyisocyanurate, polyurethane, polyvinyl chloride, polyimide, silicone, or combinations thereof. A foam utilized can have any suitable density. For example, foam can have a density of about 0.5 pounds per square foot ($lb/ft^3$) to about 8 $lb/ft^3$ or more, such as about 1 $lb/ft^3$ to about 5 $lb/ft^3$, such as about 1.5 $lb/ft^3$ to about 3 $lb/ft^3$, such as about 2 $lb/ft^3$ to about 2.5 $lb/ft^3$. In one or more exemplary embodiments, the foam has a density of about 1.5 $lb/ft^3$ to about 2.5 $lb/ft^3$.

The substrate can be a fabric such as a woven or non-woven fabric or include woven and non-woven fabrics. The fabric can be a geotextile, such as a spun-bonded geotextile or a non-woven geotextile. Spun-bonded fabric may be obtained under the tradename Typar supplied by Remay. Non-woven fabric may be obtained under the tradename Petromat supplied by Amoco Geotextiles.

Two or more layers of substrate (e.g., two sheets of fabric) can be used as a single substrate (e.g., substrate 102). Air can be trapped between the two layers of substrate which provides buoyancy to the overall liner.

The size of the substrate (e.g., length and width) can be provided depending on the desired end use of the liner. For example, if used as a liner for a secondary containment unit or a lagoon, the substrate can have a width of about 5 feet to about 20 feet, such as about 8 feet to about 16 feet, such as about 12 feet, and/or a length of about 20 feet to about 120 feet, such as about 30 feet to about 80 feet, such as about 50 feet to about 70 feet.

The substrate can be in the form of a roll having a desired width, whereby the roll is partially unwound and cut with a cutting machine or tool to produce a substrate having a desired length.

Abrasive Material

An abrasive material can be sand, coal slag, aluminum oxide, crumb rubber, ceramic beads, glass beads, or combinations thereof. Abrasive material can have any suitable shape such as spherical, oblong, among others. In some embodiments, abrasive material is substantially spherical and/or has an average particle diameter of about 0.5 mm to about 1.5 mm, such as about 0.75 mm to about 1.25 mm.

Abrasive material can have any suitable percentage of coverage of the top surface (e.g., surface 108) of the first coating. For example, abrasive material can cover the surface area of the first coating in an amount of about 0.1 $oz/ft^2$ to about 1 $oz/ft^2$, such as about 0.2 $oz/ft^2$ to about 0.6 $oz/ft^2$.

First Coating and Second Coating

The first coating can provide adhesion to the substrate and to the second coating and abrasive material. The second coating can provide adhesion to the first coating and the abrasive material in such a way to reduce or eliminate blistering and delamination of the coating(s) from the substrate and from each other. In addition, the second coating can provide aliphatic qualities (such as UV properties (reduced or eliminated UV absorption as compared to aromatics) and hydrophobicity), potable water qualities (such as non-toxicity and biodegradability), and mechanical properties (such as resistance to abrasion, tearing, puncturing, etc.). In some embodiments, a first coating can be an aromatic coating (e.g., have a high aromatic content) and the second coating can be an aliphatic coating (e.g., have a high aliphatic content).

In some embodiments, the second coating is substantially free of sulfur. For example, the second coating has a sulfur content of about 1 wt % or less, such as about 0.5 wt % or less, such as about 0.01 wt % to about 0.4 wt %, alternatively about 0 wt %. In some embodiments, sulfur content is determined based on a sulfur dioxide content and/or poly (thiosulfide).

The first coating and the second coating can be, independently, any suitable elastomeric coating. Elastomers can include polyurea, polyurethane, polyurea-polyurethane copolymers, or combinations thereof.

Polyurea can be available commercially such as polyurea available from Sherwin Williams under the name ENVIROPLASTIC™ AR200HD or Versaflex under the name FSS 50DM. Polyurea can be applied as a Part A (isocyanate) and Part B (polyamine). A polyurea can have a shore D hardness of about 40 D to about 65 D, such as about 50 D to about 60 D, according to ASTM D2240. A polyurea can have a tear strength of about 400 pounds per linear inch (PLI) to about 600 PLI, such as about 470 PLI to about 500 PLI, according to ASTM D624. A polyurea can have a tensile elongation of about 100% to about 300%, such as about 200% to about 250%, such as about 180% to about 220%, according to ASTM D638. A polyurea can have a tensile modulus (100%) of about 1,000 psi to about 1,500 psi, such as about 1,200 psi to about 1,300 psi, according to ASTM D638. A polyurea can have a tensile modulus (300%) of about 2,500 psi to about 4,000 psi, such as about 2,800 psi to about 3,200 psi, according to ASTM D638. A polyurea can have a set time of about 1 second to about 30 seconds, such as about 3 seconds to about 7 seconds, according to ASTM D1640.

A polyurea/polyurethane copolymer can be any suitable copolymer such as a 1:1 volume ratio of polyurea:polyurethane copolymer. A polyurea-polyurethane can be available commercially such as a polyurea-polyurethane copolymer available from Freedom Chemical Corp. under the name FREEDOMTUFF™ 1570 or FREEDOMTUFF™ 1595, which are UV stable polymers. In some embodiments, a polyurea-polyurethane copolymer has a hardness (shore D) of about 40 D to about 80 D, such as about 55 D to about 65 D, according to ASTM D-2240. In some embodiments, a polyurea-polyurethane copolymer has a tear resistance of about 400 PLI to about 800 PLI, such as about 400 PLI to about 500 PLI, alternatively about 600 PLI to about 700 PLI, all according to ASTM D-624. In some embodiments, a polyurea-polyurethane copolymer has a tensile strength of about 2,000 PSI to about 4,000 PSI, such as about 2,300 PSI to about 2,500 PSI, alternatively about 2,900 PSI to about 3,100 PSI, according to ASTM D-412. In some embodiments, a polyurea-polyurethane copolymer has an elongation of about 500% to about 750%, such as about 500% to about 600%, alternatively about 600% to about 650%, according to ASTM D-412. In some embodiments, a polyurea-polyurethane copolymer has, upon formation (e.g., coating of the reactants), a set time at 66° C. of about 5 seconds to about 40 seconds, such as about 12 seconds to about 25 seconds, alternatively about 9 seconds to about 12 seconds.

The presence of a first elastomer coating and a second elastomer coating can also be useful for wear detection of a liner of the present disclosure. For example, the first elastomer of the first elastomer coating can have a different color than a second elastomer of the second elastomer coating. Accordingly, if a second elastomer coating begins to wear over time, the first elastomer coating may begin to be exposed to the ambient and the color of the first elastomer coating may be seen visually.

Methods of Making Liners

A primary coating can be applied manually or robotically onto the substrate. A secondary coating can be applied manually or robotically onto the primary coating and/or abrasive medium. The abrasive medium can be applied manually or robotically onto the primary coating.

The primary coating can be applied to the substrate in an environmentally controlled indoor environment prior to delivery to the site of use or may be applied to the substrate at the site of use. The secondary coating and/or abrasive medium can be applied to the primary coating in an environmentally controlled indoor environment prior to delivery to the site of use or may be applied to the primary coating at the site of use. An environmentally controlled indoor environment can be a factory, warehouse, or other manufacturing facility.

Coatings and abrasive medium can be applied to substrates and/or to one another by any suitable method. The primary coating and/or secondary coating can be applied by spraying monomers (onto the substrate or the primary coating, respectively), e.g. using an applicator hose and nozzle. A pump can provide monomers from one or more supplies of monomers thereof, through the applicator hose, and through the nozzle onto the substrate or primary coating. The nozzle may include an impingement block for mixing monomers of the elastomer coating (e.g., isocyanate monomers, polyamine monomers, and/or polyol monomers). Spraying monomers can be performed by spraying the monomers onto the substrate or primary coating in a reciprocating pattern across the substrate to form the first coating or the second coating. The nozzle can spray liquid monomers at a flow rate of about 1 gallon per minute (gpm) to about 5 gpm, such as about 2 gpm to about 4 gpm.

Spraying monomers can be performed at a fluid temperature of about 100 degrees Fahrenheit to about 200 degrees Fahrenheit, such as about 140 degrees Fahrenheit to about 180 degrees Fahrenheit, such as about 160 degrees Fahrenheit to about 170 degrees Fahrenheit. Spraying can be performed at a spray pressure of about 1,000 pounds per square inch to about 2,500 pounds per square inch, such as about 1,500 pounds per square inch to about 2,000 pounds per square inch, such as about 1,750 pounds per square inch to about 1,850 pounds per square inch.

In some embodiments where an elastomer is a polyurea-polyurethane copolymer, the polyurea-polyurethane copolymer can be applied using a plural component, high pressure 1:1 spray equipment as a Part A and Part B. Part A and Part B can be preconditioned to about 24° C. to about 27° C. before applying. Spraying can be performed at a spray pressure of about 2,000 pounds per square inch to about 4,000 pounds per square inch, such as about 2,500 pounds per square inch to about 3,500 pounds per square inch, such as about 2,800 pounds per square inch to about 3,000 pounds per square inch and/or spraying at a fluid temperature of about 100 degrees Fahrenheit to about 200 degrees Fahrenheit, such as about 140 degrees Fahrenheit to about 180 degrees Fahrenheit, such as about 160 degrees Fahrenheit to about 170 degrees Fahrenheit.

The abrasive medium can be applied by spraying the abrasive medium in dry form or in the presence of a diluent onto the primary coating, e.g., using an applicator hose and nozzle. The abrasive medium can be applied within the gel window and/or tack free window of the first coating. For example, a gel window in some embodiments is about 30 seconds to about 2 minutes and/or a tack free window can be about 2 minutes to about 5 minutes. A pump can provide abrasive medium from a supply of abrasive medium, through the applicator hose, and through the nozzle onto the primary coating. Spraying abrasive medium can be performed by spraying the abrasive medium onto the primary coating in a reciprocating pattern across the primary coating to form the abrasive medium coated first coating. The nozzle can spray abrasive medium at a flow rate of about 1 lb/min to about 10 lbs/min, such as about 2 lbs/min to about 5 lbs/min. The nozzle can spray the abrasive medium at a pressure of about 5 psi to about 25 psi, such as about 10 psi to about 15 psi.

Additionally or alternatively, abrasive medium can be applied gravimetrically to the first coating via a hopper as the first coating is conveyed by a conveyor belt located underneath the hopper. The hopper may be about 2 inches to about 10 ft above the surface of the first coating.

In some embodiments, the abrasive medium and/or second coating are applied within a recoat window of about 1 second to about 2 hours of applying the first coating, such as about 30 seconds to about 1 hour, such as about 5 minutes to about 1 hour, such as about 10 minutes to about 30 minutes. In some embodiments, each of the abrasive medium and second coating are applied within the gel window and/or tack free window (before solidification) of the first coating. The gel window and/or tack free window can also be referred to collectively as the set time of the coating. For example, the abrasive medium and/or second coating are applied within about 1 second to about 5 minutes of applying the first coating, such as about 1 second to about 1 minute, such as about 3 seconds to about 1 minute, such as about 5 seconds to about 30 seconds. Applying each of the abrasive medium and second coating within the gel window and/or tack free window (before solidification) of the first coating can allow the abrasive medium to be locked-in to the overall liner coating in addition to the second coating being substantially adhered to the first coating, providing mechanical properties to the liner in addition to non-slip properties in addition to improvements to delamination and blistering. The tack free window (set time) of typical, commercial elastomer coatings is typically fast in order to prevent appreciable sagging and/or other warpage of the final coating.

Optionally, one or more edges of the substrate may remain uncoated or only partially coated. For example, an uncoated edge may be left about the perimeter of the substrate or only along one side or other edge segment of the substrate. The uncoated edge segment can facilitate adhesion of the substrate to an overlapping adjoining piece when the substrates are assembled and installed at a site of end use. Alternatively, a substrate is entirely coated with coatings of the present disclosure and one or more punctures (e.g., ring-shaped holes) are formed in the coated substrate to provide areas for tying with one or more ties, hooking with one or more hooks, bolting with one or more bolts, or otherwise connecting the coated substrate (liner) to another structure (e.g., another coated substrate or edge portion of a lagoon or secondary containment unit) at an end use site. Additionally or alternatively, a fully or partially coated substrate (liner) is adhered to another structure (e.g., another coated substrate or edge portion of a lagoon or secondary containment unit) using any suitable adhesive. Adhesives may include two-sided tape, a glue, a thermoset resin (such as an epoxy), or combinations thereof. Once tied, adhered, bolted, or otherwise connected to another structure, the portion of the coated substrate that is tied, adhered, bolted, or otherwise connected may be further coated (e.g., along a seam) with additional elastomer at the end use site. The liners of the present disclosure thus provide the application of far less elastomer coating at an end use site than is conventionally used when the entire liner is mostly or entirely spray coated at an end use site. Because much less coating is applied onsite, there is far less waste of such material to form the coating, fewer storage tanks, and less applicator equipment transported to the end use site.

End Uses

A coated substrate (e.g., liner) of the presented disclosure can be used for any suitable end use. The coated substrate maintains its flexibility and is easy to roll-up to compactly and conveniently be transported to a desired end use site.

Liners of the present disclosure can be used to cover at least a portion of a fluid or liquid retention area. For example, liners described herein can be used as a surface cover (e.g., covers a water surface) of a retention pond (e.g., wastewater treatment, potable water storage, recreational lagoons, pools, water parks, surf parks, etc.). The liner reduces or prevents evaporation of water or other fluid from a retention pond in addition to preventing unwanted contamination of material into the retention pond.

Liners of the present disclosure can be used as secondary containment liners. When used as a liner for a secondary containment unit, in the event of an accidental leak, overfill or spill of fluid, the liner captures the leaked fluid and retains the fluid within the walls of the secondary containment unit with the liner acting as a floor of the secondary containment unit. The liner and walls of the secondary containment unit prevent the fluid from seeping into the ground and underlying water table.

In some embodiments, a method of the present disclosure includes forming a secondary containment area for an above ground storage tank. The method includes leveling a site, laying a foundation bed (e.g., dirt or gravel), building a retaining barrier around the site, and covering the foundation bed and retaining barrier with a liner of the present disclosure.

Figure 2:
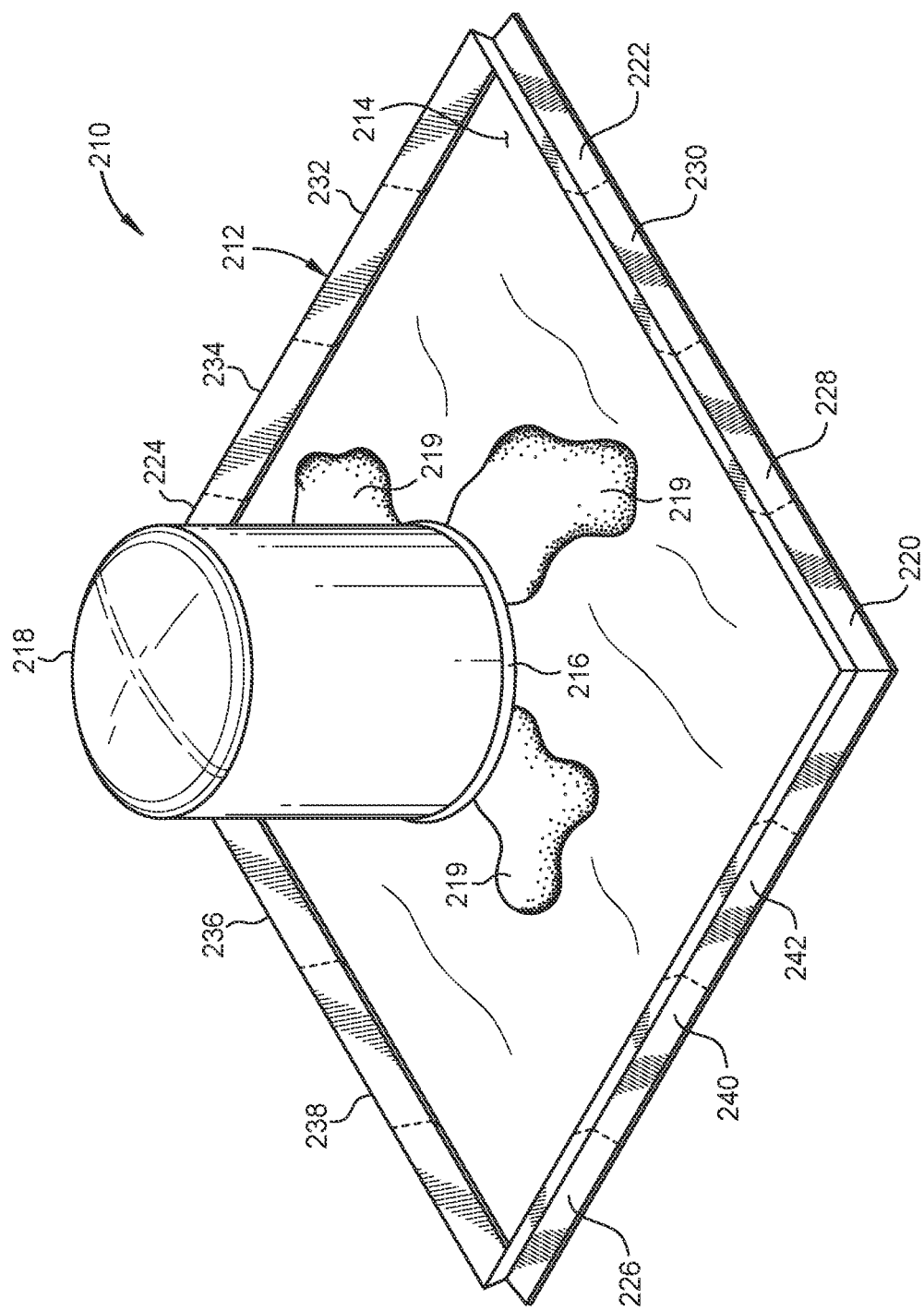
FIG. 2 is a secondary containment unit, according to an embodiment.

In some embodiments, as illustrated in FIG. 2, a system is generally referred to by the reference numeral 210 and includes a modular secondary containment unit 212 including a liner 214 that extends over the ground surface. A tank base 216 is positioned on the liner 214. An above-ground fluid storage tank 218 is positioned on, and supported by, the tank base 216. The secondary containment unit 212 surrounds the storage tank 218. In some embodiments, the overall dimensions of the secondary containment unit 212 are 40 feet by 60 feet. In some embodiments, the secondary containment unit 212 has a square or rectangular footprint, and ranges from about 10 feet to about 100 feet in length, and from about 10 feet to about 100 feet in width.

In some embodiments, the liner 214 includes a fabric having an elastomer coating on at least one side thereof, the tank base 216 engaging the side with the elastomer coating. In some embodiments, the liner 214 includes a fabric and a polyurea coating sprayed thereon. In some embodiments, the liner 214 includes a geotextile, blown fabric, felt, or other type of fabric with some degree of permeability so that the elastomer coating sufficiently adheres to the fabric and forms a solid impermeable layer. In some embodiments, the tank base 216 includes one or more polystyrene pieces, each of which is encapsulated with elastomer.

In some embodiments, the system 210 is located at an oilfield production site. The storage tank 218 is adapted to store fluids such as, for example, water used in hydraulic fracturing operations, or oil, gas, or produced water that flows out of a completed oil and gas well. If the storage tank 218 leaks fluid 219 and/or undergoes failure, the secondary containment unit 212 contains the leaked fluid 219 therewithin.

As shown in FIG. 2, the secondary containment unit 212 includes corner assemblies 220, 222, 224, and 226, and wall assemblies 228, 230, 232, 234, 236, 238, 240, and 242, all of which are connected together. The wall assembly 228 extends from the corner assembly 220, and the wall assembly 230 extends from the wall assembly 228 to the corner assembly 222. The wall assembly 232 extends from the corner assembly 222, and the wall assembly 234 extends from the wall assembly 232 to the corner assembly 224. The wall assembly 236 extends from the corner assembly 224, and the wall assembly 238 extends from the wall assembly 236 to the corner assembly 226. The wall assembly 240 extends from the corner assembly 226, and the wall assembly 242 extends from the wall assembly 240 to the corner assembly 220. The liner 214 is connected to each of the corner assemblies 220, 222, 224, and 226, and the wall assemblies 228, 230, 232, 234, 236, 238, 240, and 242, and extends across a region 244 of the ground surface defined thereby.

In operation, in an exemplary embodiment, if the above-ground fluid storage tank 218 leaks fluid or undergoes failure, such as corrosion-induced failure, the secondary containment unit 212 contains the fluid that leaks or flows from the storage tank 218, protecting the surrounding environment. The liner 214, the corner assemblies 220, 222, 224, and 226, and the wall assemblies 228, 230, 232, 234, 236, 238, 240, contain the leaking or flowing fluid, preventing the fluid from flowing into the surrounding environment. The liner 214 prevents the contained fluid from seeping into the ground.

ADDITIONAL ASPECTS

The present disclosure provides, among others, the following aspects, each of which may be considered as optionally including any alternate aspects.

Clause 1. A coated substrate, comprising:
 a substrate;
 a first elastomer coating disposed on the substrate, the first elastomer coating comprising a first elastomer selected from the group consisting of a polyurea, a polyurethane, a polyurea-polyurethane copolymer, and combinations thereof; and
 a second elastomer coating disposed on the first elastomer coating, the second elastomer coating is substantially free of sulfur and comprising a second elastomer selected from the group consisting of a polyurea, a polyurethane, a polyurea-polyurethane copolymer, and combinations thereof, wherein the first elastomer is the same as or different than the second elastomer and at least one of the first elastomer or the second elastomer is a polyurea-polyurethane copolymer.

Clause 2. The coated substrate of Clause 1, further comprising a plurality of abrasive material disposed between a first surface of the first elastomer coating and a first surface of the second elastomer coating, wherein the second elastomer coating has a plurality of protrusions at a second surface of the second elastomer coating opposite the first surface of the second elastomer coating.

Clause 3. The coated substrate of Clauses 1 or 2, wherein the first elastomer coating has a thickness of about 20 mils to about 100 mils.

Clause 4. The coated substrate of any of Clauses 1-3, wherein the second elastomer coating has a thickness of about 15 mils to about 40 mils.

Clause 5. The coated substrate of any of Clauses 1 to 4, wherein the first elastomer coating and the second elastomer coating have a total thickness of about 40 mils to about 200 mils.

Clause 6. The coated substrate of any of Clauses 1 to 5, wherein the substrate comprises a geotextile fabric sheet comprising woven fibers or non-woven fibers.

Clause 7. The coated substrate of any of Clauses 1 to 6, wherein the substrate comprises a foam having a density of about 1 lb/ft$^3$ to about 3 lb/ft$^3$.

Clause 8. The coated substrate of any of Clauses 1 to 7, wherein the abrasive material of the plurality of abrasive material is selected from the group consisting of sand, coal slag, aluminum oxide, crumb rubber, ceramic beads, glass beads, and combinations thereof.

Clause 9. The coated substrate of any of Clauses 1 to 8, wherein the abrasive material of the plurality of abrasive material is substantially spherical and has an average particle diameter of about 0.5 mm to about 1.5 mm.

Clause 10. The coated substrate of any of Clauses 1 to 9, wherein the first surface of the first elastomer coating has a percentage of coverage by the plurality of the abrasive material of about 0.1 oz/ft$^2$ to about 1 oz/ft$^2$.

Clause 11. The coated substrate of any of Clauses 1 to 10, wherein the second elastomer is a polyurea-polyurethane copolymer.

Clause 12. The coated substrate of any of Clauses 1 to 11, wherein the second elastomer has:
a hardness (shore D) of about 55 D to about 65 D, according to ASTM D-2240,
a tear resistance of about 400 PLI to about 800 PLI, according to ASTM D-624,
a tensile strength of about 2,000 PSI to about 4,000 PSI, according to ASTM D-412, and
an elongation of about 500% to about 750%, according to ASTM D-412.

Clause 13. The coated substrate of any of Clauses 1 to 12, wherein each of the first elastomer and the second elastomer is a polyurea-polyurethane copolymer.

Clause 14. A body of water, comprising:
a liquid retention area; and
the coated substrate of any of Clauses 1 to 13 disposed on the liquid retention area.

Clause 15. A method, comprising:
building a retaining barrier around a site comprising a leveled foundation bed; and
covering the foundation bed with the coated substrate of any of Clauses 1 to 13.

Clause 16. A method of making a coated substrate, the method comprising:
applying a first liquid elastomer to a substrate at a first fluid temperature of about 100 degrees Fahrenheit to about 200 degrees Fahrenheit to form a first elastomer coating; and
applying a second liquid elastomer to the first elastomer coating at a second fluid temperature of about 100 degrees Fahrenheit to about 200 degrees Fahrenheit during a time of about 5 seconds to about 5 minutes after forming the first elastomer coating to form a second elastomer coating disposed on the first elastomer coating, the second elastomer coating is substantially free of sulfur, wherein the second fluid temperature is the same as or different than the first fluid temperature.

Clause 17. The method of Clause 16, wherein the first elastomer coating comprises a first elastomer and the second elastomer coating comprises a second elastomer that is the same as or different than the first elastomer, wherein each of the first elastomer and the second elastomer is independently selected from the group consisting of a polyurea, a polyurethane, a polyurea-polyurethane copolymer, and combinations thereof.

Clause 18. The method of any of Clauses 15 to 17, wherein the time is about 5 seconds to about 30 seconds.

Clause 19. The method of any of Clauses 15 to 18, wherein the time is about 30 seconds to about 2 minutes.

Clause 20. The method of any of Clauses 15 to 19, further comprising applying a plurality of abrasive material to the first elastomer coating during the set time of the first elastomer coating.

Clause 21. The method of any of Clauses 15 to 20, wherein the second elastomer is a polyurea-polyurethane copolymer.

Overall, multi-layered elastomer-based liners and methods for making liners provide improved coatings that provide cost benefits in addition to reduced blistering and delamination of coatings from the substrate and/or other coatings of the liners. Methods of the present disclosure can also eliminate, or at least mitigate, labor-intensive surface preparation of substrates prior to coating, rendering such surface preparations unnecessary. For example, overlays eliminate direct spray coating failures as a result of inadequate surface preparation and/or surface contaminants. Liners and methods of present disclosure provide for abrasive media to embed into the liner's primary coating (first coating) followed by the secondary coating (second coating) which "locks-in" the media to create the desired texture or non-slip surface. This approach can provide additional cost savings because the abrasive medium can be utilized predominantly or exclusively at the surface of the primary coating (instead of dispersed throughout the primary coating, which would otherwise weaken the mechanical properties of the primary coating). This approach also reduces or eliminates loss of abrasive media over time, as compared to a liner having an abrasive medium applied to a primary coating and in the absence of a secondary coating.

Liners of the present disclosure can provide high quality, low cost solutions for applications meeting high performance characteristics such as NSF61 potable water, UV color stability, or NF SI B101.3-2022 DCOF (dynamic coefficient of friction) high abrasion. Therefore the topcoat systems are NSF61 certified, aliphatic, and/or high abrasion resistant.

NSF/ANSI 61 focuses on the evaluation of contaminants or impurities imparted by products that come in contact with drinking water. Unusual or unexpected impurities are frequently dependent upon the method of manufacture and the quality of the raw materials. This standard provides basic criteria to promote sanitation and protection of the public health.

UV color stability simulates ambient conditions of sunlight exposure, heat and moisture to compare how well paints, plastics or fabrics can withstand these conditions. Quantifiable results are documented via changes to gloss and/or color readings.

NF SI B101.3-2022 DCOF measures the ratio of force necessary to keep a surface already in motion sliding over another divided by weight of an object. Unless otherwise specified by the project, a measurement of 0.42 or greater DCOF on a wet surface is desired.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All numerical values within the detailed description herein are modified by "about" the indicated value, and take into account experimental error and variations that would be expected by a person having ordinary skill in the art.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise whenever a composition, an element or a group of elements is preceded with the transitional phrase "comprising," it is understood that we also contemplate the same composition or group of elements with transitional phrases "consisting essentially of" "consisting of," "selected from the group of consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

We claim:

1. A coated substrate, comprising:
   a substrate;
   a first elastomer coating disposed on the substrate, the first elastomer coating comprising a first elastomer selected from the group consisting of a polyurea, a polyurethane, a polyurea-polyurethane copolymer, and combinations thereof; and
   a second elastomer coating disposed on the first elastomer coating, the second elastomer coating is substantially free of sulfur, wherein:
   the first elastomer is the same as or different than the second elastomer, and
   the second elastomer is a polyurea-polyurethane copolymer having a hardness (shore D) of about 55 D to about 65 D according to ASTM D-2240, a tear resistance of about 400 PLI to about 800 PLI according to ASTM D-624, a tensile strength of about 2,000 PSI to about 4,000 PSI according to ASTM D-412, and an elongation of about 500% to about 750% according to ASTM D-412.

2. The coated substrate of claim 1, further comprising a plurality of abrasive material disposed between a first surface of the first elastomer coating and a first surface of the second elastomer coating, wherein the second elastomer coating has a plurality of protrusions at a second surface of the second elastomer coating opposite the first surface of the second elastomer coating.

3. The coated substrate of claim 2, wherein the abrasive material of the plurality of abrasive material is selected from the group consisting of sand, coal slag, aluminum oxide, crumb rubber, ceramic beads, glass beads, and combinations thereof.

4. The coated substrate of claim 3, wherein the abrasive material of the plurality of abrasive material is substantially spherical and has an average particle diameter of about 0.5 mm to about 1.5 mm.

5. The coated substrate of claim 3, wherein the first surface of the first elastomer coating has a coverage in weight per unit area by the plurality of the abrasive material of about 0.1 oz/ft$^2$ to about 1 oz/ft$^2$.

6. The coated substrate of claim 1, wherein the first elastomer coating has a thickness of about 20 mils to about 100 mils.

7. The coated substrate of claim 6, wherein the second elastomer coating has a thickness of about 15 mils to about 40 mils.

8. The coated substrate of claim 1, wherein the first elastomer coating and the second elastomer coating have a total thickness of about 40 mils to about 200 mils.

9. The coated substrate of claim 1, wherein the substrate comprises a geotextile fabric sheet comprising woven fibers or non-woven fibers.

10. The coated substrate of claim 1, wherein the substrate comprises a foam having a density of about 1 lb/ft$^3$ to about 3 lb/ft$^3$.

11. The coated substrate of claim 1, wherein each of the first elastomer and the second elastomer is a polyurea-polyurethane copolymer.

12. A body of water, comprising:
    a liquid retention area; and
    the coated substrate of claim 1 disposed on the liquid retention area.

13. A method, comprising:
    building a retaining barrier around a site comprising a leveled foundation bed; and
    covering the foundation bed with the coated substrate of claim 1.

14. A method of making a coated substrate, the method comprising:
    applying a first liquid elastomer to a substrate at a first fluid temperature of about 100 degrees Fahrenheit to about 200 degrees Fahrenheit to form a first elastomer coating comprising a first elastomer selected from the group consisting of a polyurea, a polyurethane, a polyurea-polyurethane copolymer, and combinations thereof; and
    applying a second liquid elastomer to the first elastomer coating at a second fluid temperature of about 100 degrees Fahrenheit to about 200 degrees Fahrenheit during a time of about 5 seconds to about 5 minutes after forming the first elastomer coating to form a second elastomer coating disposed on the first elastomer coating, the second elastomer coating is substantially free of sulfur, wherein the second fluid temperature is the same as or different than the first fluid temperature, the first elastomer is the same as or different than the second elastomer, and the second elastomer coating comprises a polyurea-polyurethane copolymer having a hardness (shore D) of about 55 D to about 65 D according to ASTM D-2240, a tear resistance of about 400 PLI to about 800 PLI according to ASTM D-624, a tensile strength of about 2,000 PSI to about 4,000 PSI according to ASTM D-412, and an elongation of about 500% to about 750% according to ASTM D-412.

15. The method of claim 14, wherein the time is about 5 seconds to about 30 seconds.

16. The method of claim 14, wherein the time is about 30 seconds to about 2 minutes.

17. The method of claim 14, further comprising applying a plurality of abrasive materials to the first elastomer coating during the set time of the first elastomer coating.

* * * * *